US010036410B2

(12) United States Patent
Lesecq

(10) Patent No.: US 10,036,410 B2
(45) Date of Patent: Jul. 31, 2018

(54) ARTICLE FOR BLIND FASTENING TO A SUPPORT

(71) Applicant: ILLINOIS TOOL WORKS INC., Glenview, IL (US)

(72) Inventor: Jean-Pierre Lesecq, Cormeilles En Parisis (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 102 days.

(21) Appl. No.: 14/760,231

(22) PCT Filed: Dec. 31, 2013

(86) PCT No.: PCT/US2013/078475
§ 371 (c)(1),
(2) Date: Jul. 10, 2015

(87) PCT Pub. No.: WO2014/113213
PCT Pub. Date: Jul. 24, 2014

(65) Prior Publication Data
US 2015/0345531 A1    Dec. 3, 2015

(30) Foreign Application Priority Data
Jan. 17, 2013   (FR) ...................................... 13 50386

(51) Int. Cl.
*F16B 13/06* (2006.01)
*F16B 19/10* (2006.01)

(52) U.S. Cl.
CPC ...... *F16B 19/1036* (2013.01); *F16B 19/1081* (2013.01)

(58) Field of Classification Search
CPC .......................... F16B 19/1036; F16B 19/1081
(Continued)

(56) References Cited

U.S. PATENT DOCUMENTS 5,211,519 A * 5/1993 Saito ................... F16B 19/1081
411/45
5,641,255 A * 6/1997 Tanaka ................ F16B 19/1081
411/45
(Continued)

FOREIGN PATENT DOCUMENTS

CN       101313166 A    11/2008
DE       8506895 U1     5/1985
(Continued)

OTHER PUBLICATIONS

ISR and WO for PCT/US2013/078475 dated Mar. 27, 2014.

*Primary Examiner* — Gary W Estremsky
(74) *Attorney, Agent, or Firm* — Hauptman Ham, LLP

(57) ABSTRACT

The invention concerns an article comprising a first part fitted with flexible lugs, a second part with a foot configured to be moved in rotation in relation to the first part, and with a head to which the foot is connected, and a blocking element, a guide zone and a locking zone configured to allow the rotation then the locking in rotation of the second part in relation to the first part, in order for the article to pass from a waiting configuration, in which the element is in the guide zone and the lugs are in a rest position, to a locked configuration in which the element is in the locking zone, the lugs are in a working position in which they are spaced in relation to the rest position and the second part is blocked in relation to the first part.

21 Claims, 5 Drawing Sheets

(58) Field of Classification Search
USPC .......................................................... 411/45
See application file for complete search history.

(56) References Cited

U.S. PATENT DOCUMENTS

| | | | | |
|---|---|---|---|---|
| 6,196,756 | B1* | 3/2001 | Leverger | ................ B60J 3/023 |
| | | | | 403/326 |
| 6,540,461 | B1* | 4/2003 | Hawang | ................ F16B 21/02 |
| | | | | 411/41 |
| 6,769,724 | B2* | 8/2004 | Krispin | .............. E05B 17/2057 |
| | | | | 292/147 |
| 7,272,873 | B2* | 9/2007 | Nessel | ................ F16B 5/0657 |
| | | | | 24/297 |
| 2005/0091802 | A1* | 5/2005 | Koike | ................... B62D 27/02 |
| | | | | 24/297 |
| 2008/0301915 | A1 | 12/2008 | Lesecq et al. | |
| 2012/0087762 | A1* | 4/2012 | Adachi | .............. F16B 19/1081 |
| | | | | 411/32 |

FOREIGN PATENT DOCUMENTS

| | | |
|---|---|---|
| FR | 2761127 A1 | 9/1998 |
| JP | 2007131142 A | 5/2007 |

\* cited by examiner

ARTICLE FOR BLIND FASTENING TO A SUPPORT

RELATED APPLICATIONS

The present application is a National Phase of International Application Number PCT/US2013/078475 filed Dec. 31, 2013 and claims priority to French Application Number 1350386 filed Jan. 17, 2013.

The invention concerns articles for blind fixing.

It aims to allow an operator to fix the article, in particular on a vehicle assembly line, without tooling and with moderate force i.e. with a force not leading to particular muscle fatigue.

It is known that articles exist comprising a first part and a second part which are assembled together by translation. These articles allow fixing of plastic motor casings onto a vehicle support provided with an opening of predetermined contour, by rotation of the second part in relation to the first part.

The first part is fitted with two flexible lugs each having a free end and being configured to assume, in the absence of stress, a rest position in which they can be introduced without force into the opening of the support, over a first predetermined length from their free end.

These flexible lugs are also configured to assume a working position in which they are spaced from the rest position, in order to fix the article to the support.

The first part comprises a stop element which is configured to rest on the support when the flexible lugs have been introduced into the opening of the support over the first predetermined length.

The first part also comprises a body to which each flexible lug is connected by a second end opposite the respective free end, which body is provided with an opening of predetermined contour which opens between the flexible lugs.

The second part is provided with a fixing foot having a free end which is configured to cooperate with the first part such that it can be introduced axially from its free end through the opening in the body of the first part, and such that it can be moved in rotation in relation to the first part in a quarter-turn movement, to cause the flexible lugs to move from their rest position to their working position.

The second part also comprises a head to which the fixing foot is connected via a second end opposite the free end.

This head is formed by a plate with an upper face in which a groove is arranged, which is configured to receive a tool for driving the second part in rotation in relation to the first part.

Because the second part is driven in rotation in relation to the first part, the article can be brought from a waiting configuration in which the flexible lugs are in their rest position, to a fixing configuration in which the flexible lugs are in their working position.

The invention aims to provide an article for blind fixing of this type but with improved performance, while being particularly simple and convenient both in production and in use.

The invention thus concerns an article to be blind-fixed to a support provided with an opening of predetermined contour, comprising:
  a first part with two flexible lugs each having a free end and being configured to assume, in the absence of stress, a rest position in which they can be introduced without force into said opening of said support, over a first predetermined length from their first free end, and to assume a working position in which they are spaced in relation to said rest position, in order to fix said article to said support, wherein a stop element is configured to rest on said support when said flexible lugs have been introduced into said opening of said support over said first predetermined length, and a body to which each said flexible lug is connected by a second end opposite said respective first free end and which is provided with an opening of predetermined contour which opens between said flexible lugs, and
  a second part fitted with a fixing foot having a free end which is configured to cooperate with said first part such that it can be introduced axially from its free end through said opening of said body of said first part, and such that it can be moved in rotation in relation to said first part to cause said flexible lugs to move from their rest position to their working position, and with a head to which said fixing foot is connected via a second end opposite said free end;
  said article being characterized in that it also comprises at least one blocking element, at least one guide zone and at least one locking zone each configured to receive said at least one blocking element, with said at least one blocking element, said at least one guide zone and said at least one locking zone being configured to allow the rotation of said second part in relation to said first part until said flexible lugs reach said working position, then the locking in rotation of said second part in relation to said first part, said article thus moving from a waiting configuration in which said blocking element is in said at least one guide zone and said flexible lugs are in their rest position, to a locked configuration in which said blocking element is in said at least one locking zone, said flexible lugs are in their working position and said second part is blocked in relation to said first part.

The article according to the invention allows guidance of the rotation of the second part in relation to the first part between its waiting configuration and a configuration for fixing this article, and then allows blocking of the second part in relation to the first part when the flexible lugs are in their working position, the article then being in its locked configuration.

It is noted that the locked configuration offered by the article according to the invention makes the latter more convenient and safe than the prior article described above, which offers only a fixing configuration (not locked).

In other words, the blocking element and the guide and locking zones of the article according to the invention are configured to allow guidance and prevent return in rotation of the second part in relation to the first part in the absence of stress. It is also noted that to unlock the second part in relation to the first part, or in other words to return the article to the waiting configuration, the blocking element and the guide and locking zones of the article according to the invention are configured such that a particularly high force is required. In other words, unlocking requires a far greater force than the force applied for locking.

According to preferred, simple, convenient and economic characteristics of the article according to the invention:
  said guide and locking zones are distinct zones separated by an obstacle;
  said guide zone is formed by a circumferential groove, said locking zone is formed by an opening arranged immediately adjacent to said circumferential groove, and said blocking element is formed by a rigid finger arranged protruding from a face of said article and intended to be introduced and guided in said circumferential groove and then to be introduced into said opening;

said article also comprises a boss arranged protruding into said circumferential groove at a distance from an end of said circumferential groove which is situated close to said opening;

said blocking element has a parallelepipedic form and has a first face with a first predetermined slope and a second face opposite said first face and with a second predetermined slope greater than the first slope, said first face being directed towards said locking zone on movement of said blocking element in said guide zone, and said second face being directed towards said guide zone when said blocking element is in said locking zone;

said second part comprises said at least one blocking element, and said first part comprises said at least one guide zone and said at least one locking zone;

said guide and locking zones are arranged in said body of said first part and said at least one blocking element extends protruding from a lower face of said head of said second part, which lower face is configured to come to rest against an upper face of said body;

said body also comprises a lower face opposite said upper face, which lower face has a flat central portion and a sloping peripheral portion, and said guide and locking zones are arranged peripherally on said body and open both in said upper face and in said sloping peripheral portion of said lower face of said body;

said fixing foot comprises a trunk having an outer lateral wall, and two spacing elements protruding from said outer lateral wall and configured to come into contact with the inner faces of said flexible lugs;

said inner face of each said flexible lug has a sloping portion and each said spacing element has a sloping portion with a slope similar to that of said sloping portion of said inner face of each said flexible lug;

said first part also comprises at least one rotational stop element protruding from a lower face of said body close to said opening of said first part, and both said spacing elements are each provided with a side wall configured to come to rest against said at least one rotational stop element when said article is in its locked configuration;

said fixing foot comprises a trunk with a globally rectangular contour defining two lateral spacing faces opposite each other and configured to come into contact with flat portions arranged on the inner faces of said flexible lugs;

said article comprises stop elements formed on said first and second parts and configured to retain said second part axially in relation to said first part;

said flexible lugs of said first part having opposing inner faces, lateral faces connecting said inner faces and depressions opening respectively in one said inner face and one said lateral face, and said fixing foot of said second part comprises two teeth extending radially and configured to be accommodated in said depressions when said article is in the locked configuration; and/or said head is formed by a hook with an undercut configured to receive a peg of a vehicle sun visor.

The invention will now be described below with reference to an exemplary embodiment, given below as illustration and without limitation, with reference to the attached drawings on which:

FIGS. 1 to 7 illustrate an article 1 comprising a first part 10 and a second part 9 which are assembled and here shown in a waiting configuration.

The first and second parts 10 and 9 are each made of plastic molded from a single piece.

Figure 8:
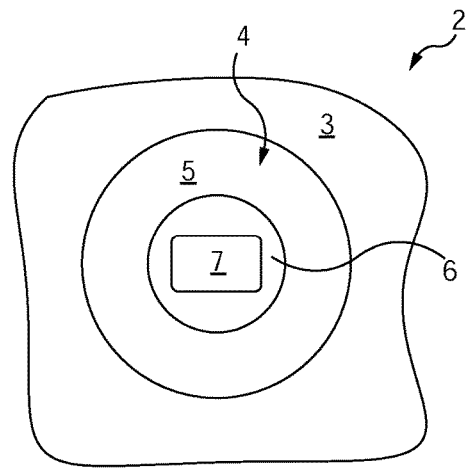
FIG. 8 is a plan view, showing partially and in isolation a support on which the article of FIGS. 1 to 7 is to be fixed.
Figure 9:
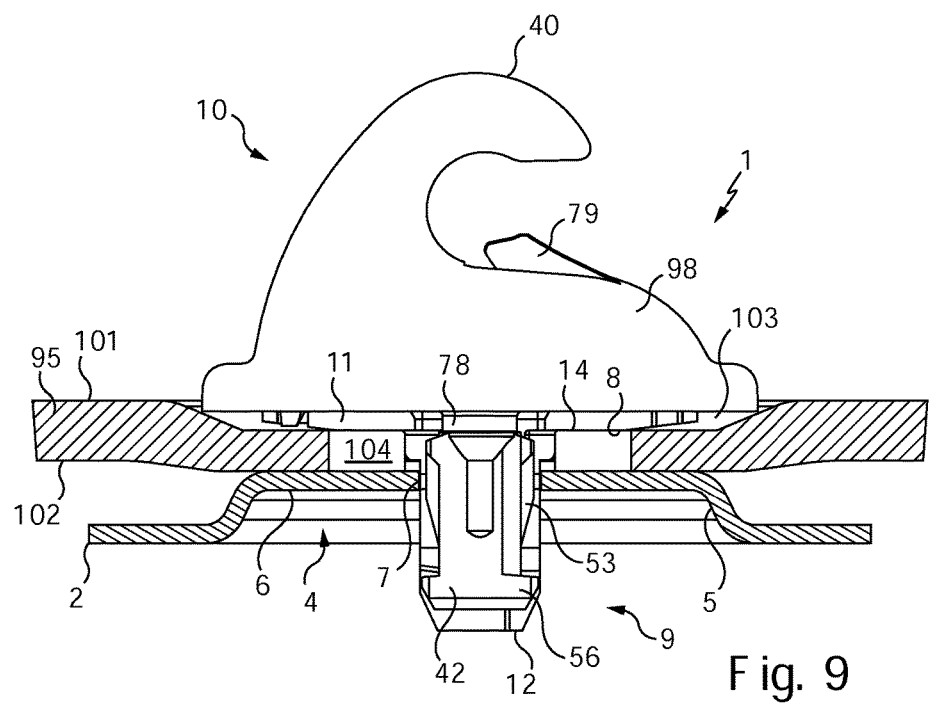
FIGS. 9 and 10 are profile views of the article in FIGS. 1 and 7 mounted, together with a panel, on the support of FIG. 8, respectively in a waiting configuration and in a locked configuration.
Figure 10:
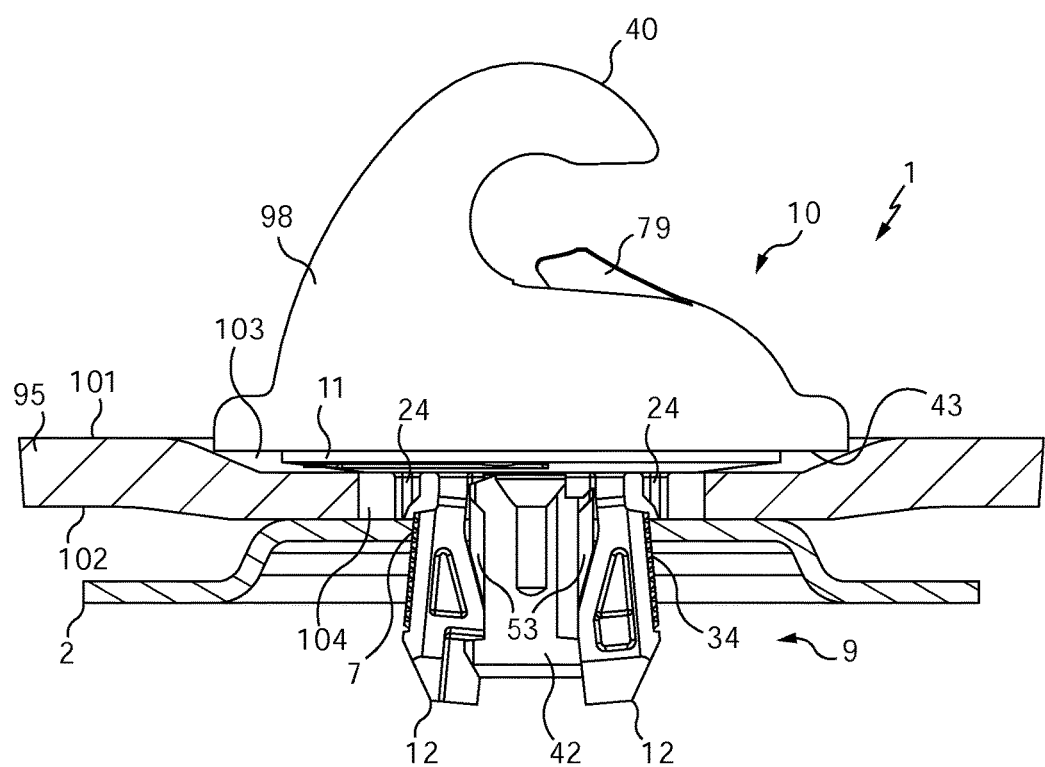

The article 1 is configured to be blind-fixed to a support 2, here formed by a vehicle body panel situated above a vehicle windscreen (FIG. 8), with an element, here a trim panel 95, sandwiched between the second part 9 and the support 2 (FIGS. 9 and 10).

The article 1 extends globally in an axial direction.

The first part 10 comprises two flexible lugs 12 and a body 11 to which each flexible lug 12 is connected, while the second part 9 is fitted with a fixing foot 42 configured to cooperate with the first part 10 and the head 40 to which the fixing foot 42 is connected.

The body 11 of the first part 10 has a flat, circular plate-like form, in which a substantially rectangular opening 15 is arranged centrally, the corners of which are rounded, and which opens between the flexible lugs 12.

The body 11 has an upper face 13 and a lower face 14 opposite the upper face 13.

The upper face 13 is flat while the lower face 14 has a flat central portion 8 in which the opening 15 is arranged, and a sloping peripheral portion 86, almost frustoconical, which connects to the flat central portion 8.

The opening 15 opens into the upper and lower faces 13 and 14.

The opening 15 has two opposing long sides 62 and two opposing short sides 87, and two bulges 16 each of arcuate form and arranged in the two respective long sides 62.

The first part 10 also has two circumferential grooves 17, also known as the guide zones, each of arcuate form and extending almost as far as a quarter circle, and two openings 19, also called locking zones, each arranged in the body 11. The two grooves 17 and the two openings 19 each open both into the upper and lower faces 13 and 14.

The grooves 17 and the openings 19 are distinct zones separated from each other by an obstacle 20, here formed by a material zone of the body 11.

The openings 19 are arranged immediately next to and in the circumferential extension of the respective grooves 17.

Each assembly formed by a groove 17, an obstacle 20 and an opening 19 extends globally over a quarter of a circle, and the two assemblies formed are here arranged diametrically opposite each other on the body 11.

Each groove 17 has a first end 21 and a second end 22 which is opposite the first end 21 and situated immediately next to the opening 19, next to the respective groove 17, and an inner wall 88 delimiting a guide space of predetermined length between these ends 21 and 22.

The first part 10 also comprises two bosses 18 each arranged protruding from the inner wall 88 in the guide space of a respective groove 17.

These bosses 18 are each located next to the first end 21 of a respective groove 17 and hence at a distance from the second end 22.

The bosses 18 each locally constrict the guide space of the respective groove 17.

Each opening 19 in cross section has a globally square form, and has an inner wall 23 which delimits a locking space.

Each opening 19 immediately follows a groove 17 on the side of its second end 22, with the obstacle 20 separating the opening 19 from the respective groove 17.

The material zones of the body 11 which form the two obstacles 20 each have a first leading edge 92, connecting to the inner wall 88 of the respective groove 17 at the level of the second end 22, and a second leading edge 93, opposite the first leading edge 92 and connecting to the inner wall 23 of the respective opening 19.

The body 11, grooves 17 and openings 19 are configured such that the upper face 13 of the body 11 substantially forms a right angle both with the inner wall 88 of each groove 17, at the level of the first leading edge 92 of each obstacle 20, and with the inner wall 23 of each opening 19, at the level of the second leading edge 93 of each obstacle 20.

The grooves 17 and the openings 19 are here configured such that the diagonal linking the first two ends 21 of grooves 17 passes through the opening 15 arranged in the body 11, through its short sides 87, whereas the diagonal linking the two openings 19 passes through the opening 15 in the body 11, through its long sides 62, intersecting the bulges 16.

In other words, the first two ends 21 are each arranged opposite a respective short side 87 of the opening 15, while the two openings 19 are each arranged facing a long side 62 of the opening, at the level of the respective bulge 16.

The two flexible lugs 12 each protrude from the central flat portion 8 of the lower face 14 of the body 11, and each extend axially between a first end 37—also called the free end—and a second end 89 opposite the first end 37, at the level of which each lug 12 is joined to the body 11.

Each lug 12 has an inner face 29, an outer face 30 opposite the inner face 29, a first flat lateral face 63 connecting the inner and outer faces 29 and 30, and a second flat lateral face 64 opposite the lateral face 63 and also connecting the inner and outer faces 29 and 30.

The inner face 29 has a first flat portion 31 connected to the body 11 by its second end 89, a second flat portion 33 opposite the first flat portion 31, and a sloping portion 32 of predetermined slope connecting the first and second flat portions 31 and 33. It is noted that the inner face also has a transition portion (not shown) between the sloping portion 32 and the first flat portion 31.

The outer face 30 has a first flat portion 71 which is connected to the body 11 by its second end 89, a second straight portion 72 which is connected to the first portion 71, and a sloping third portion 73 which is connected to the second portion 72.

A plurality of notches 34 are arranged in the second straight portion 72 of each lug 12, such that these notches 34 each have a base and a recess in relation to the second straight portion 72 and a peak at the level of the second straight portion 72.

It is noted that the second straight portion 72 is offset axially in relation to the first flat portion 71 so as to form a shoulder 91 between the portions 71 and 72, with the first flat portion 71 being closer to the axis of the article 1 than the second straight portion 72.

Each lug 12 also has a depression 35 which opens both into the second flat portion 33 of the inner face 29, in its first lateral face 63 and at the level of its first free end 37.

Each depression 35 thus has a lateral opening 38 arranged in the lateral face 63 of the respective lug 12, a lower opening 67 arranged at the level of the first free end 37 of the respective lug 12, and an inner opening 68 arranged in the second flat portion 33 of the inner face 29 of the respective lug 12.

Each depression 35 extends from the lateral opening 38 to the inner lateral wall 36 arranged in the respective lug 12 opposite the lateral opening 38, from the lower opening 67 up to the upper inner wall 39 arranged in the respective lug 12 and opposite the lower opening 67, and from the inner opening 68 to an inner base wall 66 arranged in the respective lug 12 opposite the inner opening 68.

The upper inner wall 39 has a curved portion and a flat portion connected to the curved portion, the latter extending from the lateral opening 38 to the flat portion.

The two flexible lugs 12 are symmetrical (mirror image) to each other such that the inner face 29 of one lug 12 faces the inner face 29 of the other lug 12, and such that the recesses 35 are arranged staggered. In other words, the lateral inner wall 36 arranged in a lug 12 is diagonally opposite the lateral inner wall 36 arranged in the other lug 12, and the same applies to the lateral openings 38 arranged in the lugs 12.

It is noted that each lug 12 has a rigid part (not shown) formed at the level of portions 31 and 71 of the inner and outer faces 29 and 30 respectively, and a flexible part (not shown) in relation to the rigid part, which flexible part is formed by the rest of the respective lug 12.

In the absence of stress (FIGS. 1 to 3, 7 and 9), the flexible lugs 12 assume a rest position in which the two flat portions 33 of the inner faces 29 of the respective lugs 12 are at a first predetermined distance apart. The same applies to the second flat portions 72 of the outer faces 30 of the respective lugs 12, which are at a second predetermined distance apart.

These lugs 12 are also configured to be spaced apart when stressed at the level of their respective inner faces 19.

The lugs 12 then assume a working position in which the second flat portions 33 of the inner faces 29 of the respective lugs 12 are at a third predetermined distance apart, with the third distance being greater than the first distance. The same applies to the second flat portions 72 of the outer faces 30 of the respective lugs 12 which are at a fourth predetermined distance apart, with the fourth distance being greater than the second distance (see detail below).

The first part 10 also comprises two similar blades 24 which each protrude from the central flat portion 8 of the lower face 14 of the body 11 and each extend axially towards a respective free end 94.

Each blade 24 has an inner face 25 and an outer face 26 opposite the inner face 25.

The outer face 26 is flat while the inner face 25 has a flat portion, on the side of the body 11, and a curved portion, on the side of the free end 94.

Each blade 24 is configured such that its respective inner face 25 is arranged opposite the first flat portion 71 and partially opposite the second straight portion 72 of the outer face 30 of the respective lug 12. Thus the first two lugs 12 extend partially between the two blades 24.

More precisely, each blade 24 is configured such that the flat portion of its inner face 25 is arranged opposite the first flat portion 71 of the outer face 30 of a respective lug 12, while the curved portion of its inner face 25 is arranged opposite a shoulder 91 formed between the portions 71 and 72 of a respective lug 12.

Each blade 24 is also configured to come to rest against the support 2 (FIG. 10) and thus form an axial positioning stop for the article 1 (see below).

The arrangement of the blades 24 and flexible lugs 12 in relation to each other is particularly compact, while offering sufficient movement clearance both for the blades 24 and the lugs 12, when stressed, not to impact on each other.

The first part 10 also comprises two similar rotational stop elements 27 which each protrude from the central flat portion 8 of the lower face 14 of the body 11 and each extend axially towards the respective free end 69 close to the opening 15.

Each rotational stop element 27 is arranged against the first flat portion 31 of the inner face 29 of a respective lug 12, the first flat portion 31 to which each rotational stop element 27 is connected by a first lateral wall 96 and a second lateral wall 97 opposite the first lateral wall 96.

Each rotational stop element 27 also has a curved wall 28 which connects to the first lateral wall 96 and is arranged below a respective bulge 16 provided in the opening 15, and an inner wall 70 which connects to the curved wall 28 and to the second lateral wall 97 and which is arranged axially in the extension of a respective long side 62 of the opening 15.

The second part 9 comprises a fixing foot 42 connected to the head 40 which is here formed by a hook.

The hook 40 comprises a body 98 which, on the side opposite the foot 42, has an undercut 75 configured to receive a hinge peg of the vehicle sun visor (not shown).

The hook 40 also comprises, on the side turned towards the foot 42, a first depression 76 and a second depression 99 each arranged in the body 98, and the latter comprises a base portion 47 separating the first and second depressions 76 and 99.

The hook 40 has a flat lower face 43 where the foot 42 is joined, at the level of the base portion 47.

The hook 40, at the level of its lower face 43, has a circular outer contour globally corresponding to that of the body 11 of the first part 10, and the hook 40 and the body 11 are configured such that the lower face 43 of the hook 40 comes to rest against the upper face 13 of the body 11 (see below).

The hook 40 also comprises a flexible tongue 79 which is joined to the body 98 and projects into the undercut 75.

The body 98 is fitted with a window 81 which opens into the first depression 76 and allows movement of the flexible tongue 79 in relation to the body 98 when the latter is stressed by the peg when inserted in the undercut 75.

The second depression 99 is limited by an inner wall 77 of the body 98 which also comprises a rib 78 extending globally axially along this inner wall 77.

The rib 78 opens at one end at the level of the lower face 43 of the hook 40, and at its end has a blocking finger 44, also called a blocking element which protrudes from this lower face 43.

The finger 44 is intended to be introduced and guided in one of the circumferential grooves 17, then to be introduced into the opening 19 of the first part 10 which circumferentially directly succeeds the groove 17.

The finger 44 has a parallelepipedic form with a base 41, a flat end face 83 opposite the base 41, a first face 45 having a first predetermined slope and connecting the base 41 to the end face 83, and a second face 46 opposite the first face 45 and also connecting the base 41 to the end face 83, with a second predetermined slope greater than the first slope.

It is noted that the first face 45 forms a locking face while the second face 46 forms an unlocking face.

The first face 45 here has a slope a1 in relation to the base 41 which lies in the range 35°-60°, while the second face 46 here has a slope a2 in relation to the base 41 which lies for example in the range 70°-90°.

The finger 44 is configured such that its first face 45 is directed to the opening 19 when this finger 44 moves in the respective groove 17, and such that the second face 46 is directed towards the groove 17 when the finger 44 is in the respective opening 19 (see below).

The foot 42 is configured to pass at least partly through the opening 15 arranged in the body 11 of the first part 10.

The foot 42 comprises a cylindrical portion 48 forming a brace which is connected to the lower face 43 of the hook 40 at the level of the base portion 47, and a trunk 85 which extends axially from the cylindrical portion 48 to a free end 61.

The cylindrical portion 48 has a height substantially equal to the depth of the opening 15 and is configured to be arranged in the opening 15 of the body 11 of the first part 10.

The trunk 85 has a globally rectangular contour and has two long sides 50 opposite each other and two short sides 51 opposite each other, these four sides defining a lateral outer wall 100.

Each short side 51 is connected to two long sides 50 by two respective junctions, one of which forms a rounded portion 52.

The trunk 85 thus has two rounded portions 52 which are arranged diametrically opposed.

Each short side 51 is also configured to come into contact with the second flat portion 33 of the inner face 29 of the respective lug 12, with the respective rounded portion 52 which is configured to meet the second flat portion 33 first.

The foot 42 also comprises two protuberances 49 which each protrude from a respective long side 50 of the trunk 85.

Each protuberance 49 has a frustoconical portion (not shown), the wider end of which is located at the level of a junction between the trunk 85 and the cylindrical portion 48, and a semi-cylindrical portion (not shown) which extends in the extension of the narrowest end of the frustoconical portion over part of the length of the respective long side 50.

The wider end of each protuberance 49 is configured so as to form, together with the trunk 85, an axial stop element 90 for the second part 9 in relation to the first part 10 (see below), which axial stop element 90 has a diameter which is slightly greater than the distance separating the two bulges 16 of the opening 15.

The foot 42 also comprises two spacing elements 53 which each protrude from a short side 51 of the trunk 85, and which each extend axially from the junction between the trunk 85 and the cylindrical portion 48 over part of the length of this short side 51.

Each element 53 has two opposing side walls 84 extending radially from a respective short side 51 to which they are connected, and an outer wall 82 which connects to each side wall 84.

A side wall 84 of each element 53 is configured to come to rest against a rotational stop element 27 of the first part 10 when the article is a locked configuration.

The outer wall 82 has a flat T-shaped portion 54 with the upper branch of the T situated on the side of the cylindrical portion 48 of the foot 42, and a sloping portion 55 which connects to the flat portion 54 and returns to the outer lateral wall 100 of the trunk 85.

The elements 53 are each configured to come into contact with the inner face 29 of a respective lug 12, with the sloping portion 55 of the respective element 53 having a slope similar to that of the sloping portion 32 of the inner face 29 of the respective lug 12.

It is noted that the length of the sloping portion 55 of the respective element 53 is substantially equal to the length of the sloping portion 32 of the inner face 29 of the respective lug 12, and that the length of the flat portion 54 is substantially equal to the length of the flat portion 31 of the inner face 29 of the respective lug 12.

The locking foot 42 also comprises two teeth 56 formed at the free end 61 of the foot 42, which teeth 56 extend radially.

Each tooth 56 comprises a flat upper face 57 which connects to a respective short side 51 of the trunk 85, two opposing lateral faces 58 which are each connected to a respective long side 50 of the trunk 85, an outer face 74 which connects the two lateral faces 58 and to the flat upper face 57, and a sloping lower face 59 which is opposite the flat upper face 57.

Each tooth 56 is configured to be accommodated in the depression 35 of a respective lug 12 in the locked configuration of article 1, and the upper face 57 of each tooth 56, together with the inner upper wall 39 arranged in the respective lug 12, is configured to form axial stop elements in order to retain the second part 9 axially in relation to the first part 10.

It is noted that each tooth 56 lies in the axial extension of a respective spacing element 53 and that the upper face 57 of each tooth 56 is at a predetermined distance from the sloping portion 55 of the respective element 53, which predetermined distance is slightly greater than the length of the second flat portion 33 of the inner face 29 of the respective lug 12.

Figure 1:
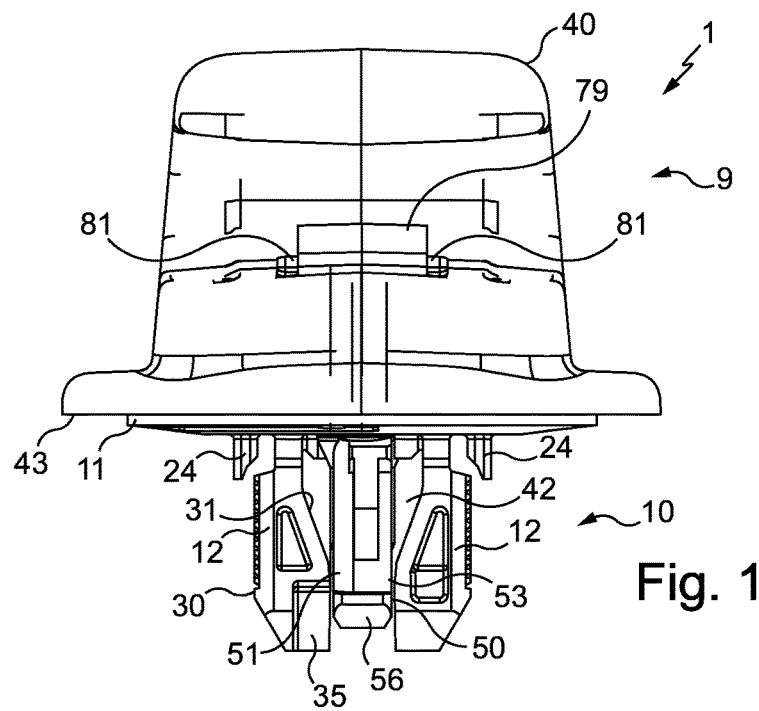
FIG. 1 is a front view of an article according to the invention, taken in isolation, in a waiting configuration.
Figure 2:
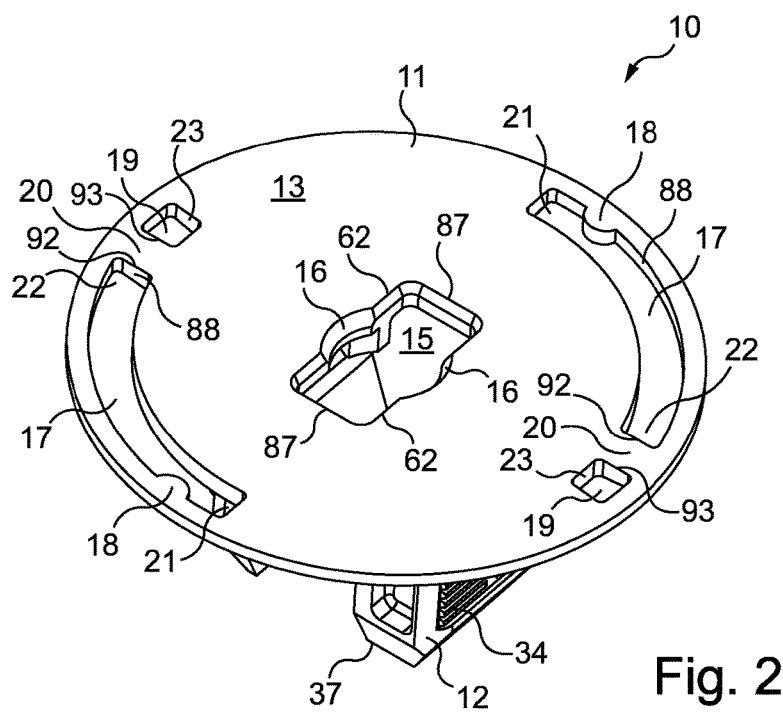
FIGS. 2 and 3 are perspective views, taken from different angles, of a first part of the article of FIG. 1.
Figure 3:
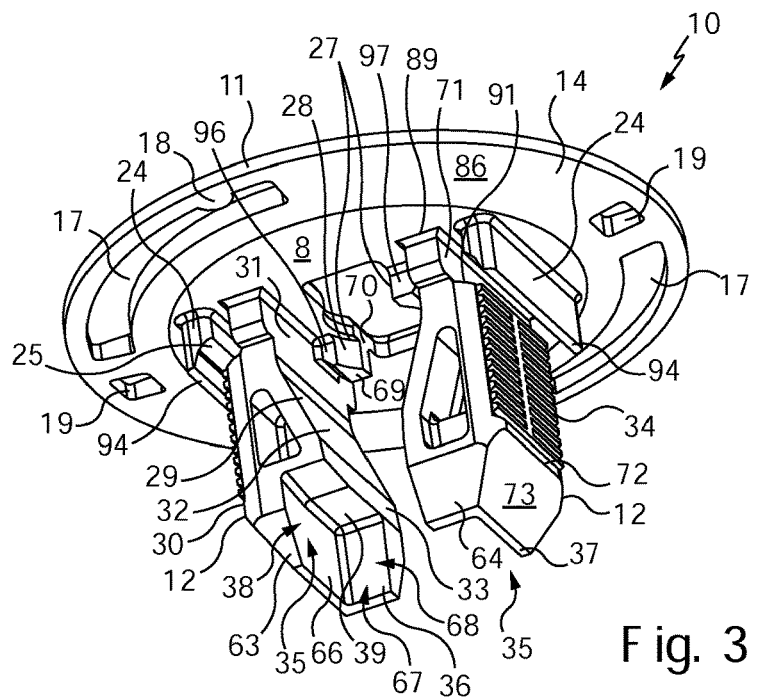
Figure 4:
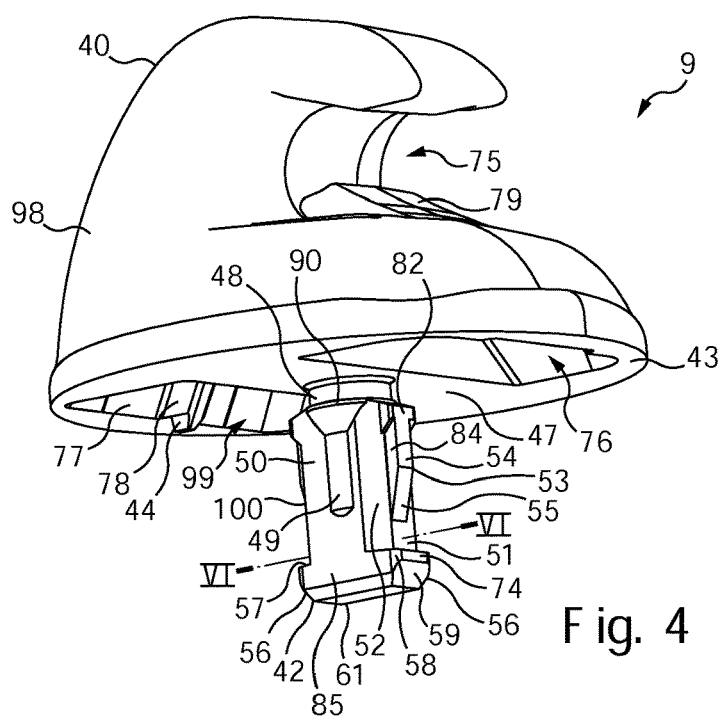
FIG. 4 is a perspective view of a second part of the article of FIG. 1.
Figure 5:
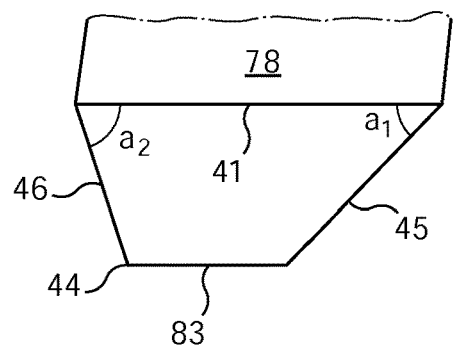
FIG. 5 is a diagrammatic representation of a blocking finger of the second part of FIG. 4.
Figure 6:
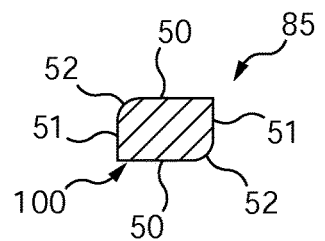
FIG. 6 shows diagrammatically in cross section a portion of a fixing foot of the second part, at the level of marking of VI-VI on FIG. 4.
Figure 7:
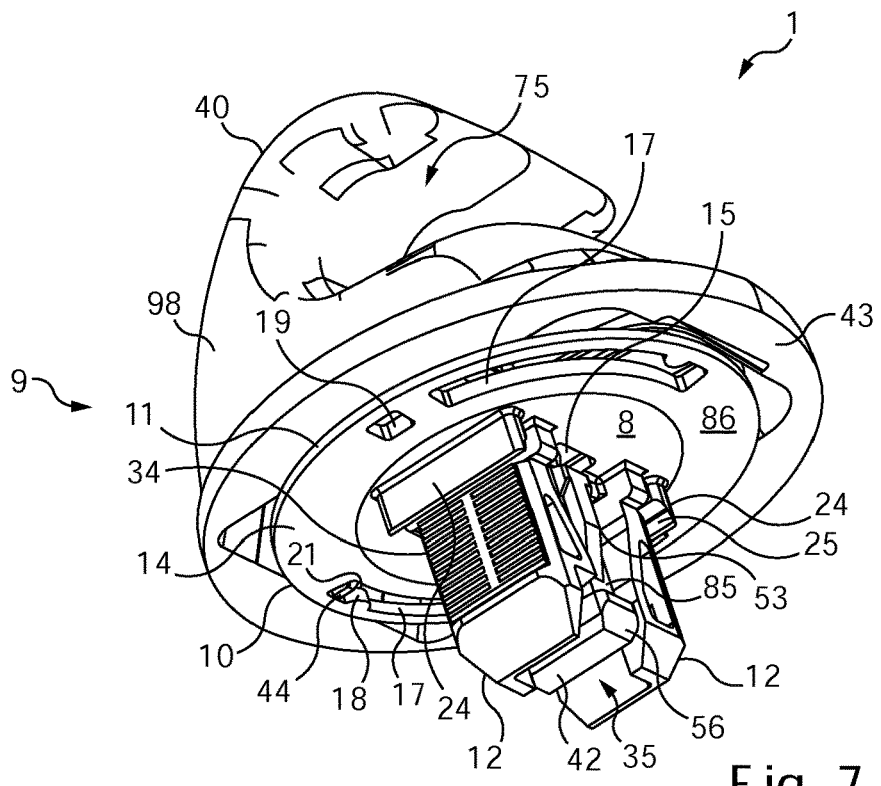
FIG. 7 is a perspective view of the article in FIG. 1.

We will now describe the assembly of the first and second parts 10 and 9 in order to obtain the article 1 in its waiting configuration (FIGS. 1 and 7).

The second part 9 is presented opposite the first part 10, with the locking foot 42 facing the upper face 13 of the body 11, and said foot is inserted in the opening 15, the long sides 50 of the trunk 85 of the foot 42 running along the long sides 62 of the opening 15.

The foot 42 slides freely into the opening 15 until the axial stop element 90 formed on the trunk 85 of the foot 42 comes into contact with the lateral bulges 16.

The application of a force is necessary to cause this element 90 to pass from the upper face 13 to the lower face 14 of the body 11, and hence to continue the insertion of the foot 42 in the opening 15.

Thus once the element 90 is opposite the flat portion 8 of the lower face 14, the foot 42 is clipped onto the first part 10, and more generally the second part 9 is fixed to the first part 10.

The insertion of the foot 42 continues until the lower face 43 of the body 98 of the hook 40 comes to rest against the upper face 13 of the body 11, the finger 44 being introduced into one of the grooves 17 at the level with its first end 21.

The first and second parts 10 and 9 are then assembled and the article 1 is in its waiting configuration, in which its lugs 12 are in their rest position.

In the waiting configuration, the long sides 50 of the trunk 85 of the foot 42 are each opposite the inner face 29 of a respective lug 12, the spacing elements 53 and the teeth 56 of the foot 42 are each substantially perpendicular to the inner face 29 of a respective lug 12, each tooth 56 is situated opposite a respective depression 35, and the cylindrical portion 48 of the foot 42 is arranged in the thickness of the opening 15.

Thanks to the two grooves 17 and the two openings 19, the second part 9 can be mounted on the first part 10 without a forced orientation of the undercut 75 of the hook 40 (around half a turn).

In this waiting configuration, the article 1 is brought to the operator on the assembly line, who need now merely proceed to mount the article 1 on the support 2 and the panel 95.

The support 2 has a substantially flat surface 3 connecting to a dish 4 with sloping sides 5 and a substantially flat base 6 parallel to the surface 3, in which a rectangular opening 7 is provided, the corners of which are rounded (see also FIGS. 9 and 10).

The support 2 is covered by a trim panel 95 with an upper face 101, a lower face 102 opposite the upper face 101, a dish 103 provided in the upper face 101 and a passage hole 104 which is provided in the dish 103 and is larger than and surrounds the opening 7 of the support 2.

To proceed with the mounting of the article 1 in the waiting configuration, the hook 40 is presented facing the assembly formed by the support 2 and panel 95, with flexible lugs 12 first, aligned with the hole 104 and opening 7 in which they are inserted.

As explained above, the lugs 12 pass through the hole 104 and the opening 7 without requiring particular force until, firstly, the flat portion 8 of the lower face 14 of the body 11 comes to rest on the upper face 101 of the panel 95 at the level with the dish 103, and secondly, the free end 94 of each blade 24 comes to rest on the base 6 of the support 2. The article 1 cannot be inserted further.

It is noted that the notches 34 of the lugs 12 then rest lightly against the contour of the opening 7 of the support 2.

To bring the lugs 12 from their rest position to their working position, in which they are spaced apart in relation to their rest position, and hence to bring article 1 from its waiting configuration to its locked configuration, the hook 40 serves as a handle to drive (or move) the first part 10 in rotation over a quarter-turn in relation to the second part 9.

A light force is necessary on the hook 40 to cause the finger 44 to leave the first end of the groove 17 in which it is introduced and pass the boss 18.

The force must be maintained in order to cause the finger 44 to slide in this groove up to the second end 22.

The purpose of this force is to cause the foot 42 to turn, such that the rounded portions 52 of its trunk 85 each come into contact with the second flat portion 33 of the inner face 29 of the respective lug 12.

Thus the short sides 51 and the sloping portions 55 of the spacing elements 53 come to rest progressively against the second flat portion 33 and the sloping portion 32 of the inner face 29 of a respective lug 12, so as to cause the lugs 12 to move apart, out of their rest position.

During this rotation, each tooth 56 of the foot 42 becomes accommodated in the depression 35 of a respective lug 12, entering by its lateral opening 38.

The force is relatively constant until the first face 45 of finger 44 comes into contact with the first leading edge 92 of the obstacle 20, at the level of the second end 22 of the groove 17 in which the finger 44 slides.

The force exerted on the hook 40 must then be greater, in order to enable this first face 45 to slide over this first leading edge 92 and thus enable the finger 44 to pass above the obstacle 20 until it is introduced in the opening 19 immediately succeeding the groove 17, and thus complete the quarter-turn movement.

Once the finger 44 is in the opening 19, rotation of the second part 9 in relation to the first part 10 is stopped, and the finger 44 is blocked in this opening 19 such that the article 1 is in its locked configuration, in which the second part 9 and first part 10 are blocked in rotation (as well as being blocked in axial translation by the stop element 90). The article 1 is then locked with the lugs 12 in their working position.

It is noted that it is not possible for the finger 44 to leave the opening 19 without a particularly great force (much greater than the force required to introduce it), such that this locked configuration of the article 1 is particularly safe.

This is due to the fact that the second face 46 of the finger 44, which is then turned towards the groove 17, has a second predetermined slope which is greater than the first predetermined slope of the first face 45 of the finger 44.

In this locked configuration, a side wall 84 of each element 53 of foot 42 comes to rest against the first lateral wall 96 of the respective rotational stop element 27 of the first part 10.

In this locked configuration, the long sides 50 and short sides 51 respectively of the trunk 85 of the foot 42 are oriented transversely to the long sides 62 and short sides 87 respectively of the opening 15.

In this locked configuration, each tooth 56 is accommodated in the depression 35 of a respective lug 12, one of its lateral faces 58 facing the inner lateral wall 36 arranged in the respective lug 12, and the upper face 57 of each tooth 56, together with the upper inner wall 39 arranged in the respective lug 12, forming axial stop elements to improve further the axial retention of the second part 9 in relation to the first part 10.

In this locked configuration, as explained above, the lugs 12 are in their working position where they are spaced apart in relation to their rest position, and the notches 34 arranged on the outer faces 30 are locked against the contour of the opening 7 of the support 2, which further improves the axial retention of the article 1 on the support 2.

In this locked configuration, the article 1 is therefore fixed on support 2 thanks in particular to the anchorage of the first part 10 on the latter, and the first and second parts 10 and 9 are blocked axially and in rotation in relation to each other.

If for any reason the article 1 must be returned to its waiting configuration, it is necessary to force the hook 40 in rotation in the opposite direction from the direction in which it was first turned, in order to release the finger 44 from the opening 19 and cause it to enter the groove 17.

The force necessary to unlock the finger 44 is particularly high (the force is greater to that necessary for locking) in order to allow the second face 46 of the finger 44 to slide on the second leading edge 93 of the obstacle 20, and thus allow the finger 44 to pass above the obstacle 20 until it enters the groove 17 immediately next to the opening 19.

It is noted that it may be necessary to use a tool such as a screwdriver to form a lever arm to bring the finger 44 slightly out of the opening 19, in order to begin the rotation of the second part 9 in the reverse direction.

In variants not shown:
the second part is fitted with two blocking fingers;
the first part is fitted with only a single guide groove and a single blocking opening;
the flexible lugs do not have depressions, and the teeth of the fixing foot are configured to pass beyond the free ends of these lugs;
the flexible lugs more generally have a different shape from that shown on the drawings;
the head of the second part is not a hook but rather another element which can be mounted blind on any wall; and/or
the article is fixed to a globally flat zone of the support, without the mounting opening being arranged in the base of a dish.

It is generally recalled that the invention is not limited to the examples described and shown.

The invention claimed is:

1. An article to be blind-fixed to a support provided with an opening of predetermined contour, comprising:
   a first part with two flexible lugs each having a free end and being configured to assume, in the absence of stress, a rest position in which they can be introduced without force into said opening of said support, over a first predetermined length from their first free end, and to assume a working position in which they are spaced in relation to said rest position, in order to fix said article to said support, wherein an element is configured to rest on said support when said flexible lugs have been introduced into said opening of said support over said first predetermined length, and a body to which each said flexible lug is connected by a second end opposite said respective first free end and which is provided with an opening of predetermined contour which opens between said flexible lugs, wherein the element configured to rest on said support protrudes away from the body in a direction normal to a bottom face of the body, and
   a second part fitted with a fixing foot having a free end which is configured to cooperate with said first part such that it can be introduced axially from its free end through said opening of said body of said first part, and such that it can be moved in rotation in relation to said first part to cause said flexible lugs to move from their rest position to their working position, and with a head to which said fixing foot is connected via a second end opposite said free end;
   said article being characterized in that it also comprises at least one blocking element, at least one guide zone and at least one locking zone each configured to receive said at least one blocking element, said at least one blocking element, said at least one guide zone and said at least one locking zone being configured to allow the rotation of said second part in relation to said first part until said flexible lugs reach their working position, then the locking in rotation of said second part in relation to said first part, said article thus moving from a waiting configuration in which said blocking element is in said at least one guide zone and said flexible lugs are in their rest position, to a locked configuration in which said blocking element is in said at least one locking zone, said flexible lugs are in their working position and said second part is blocked in relation to said first part.

2. The article as claimed in claim 1, wherein said guide zone is formed by a circumferential groove, said locking zone is formed by an opening arranged adjacent to said circumferential groove, and said blocking element is formed by a rigid finger arranged protruding from a face of said article and intended to be introduced and guided in said circumferential groove then to be introduced in said opening.

3. The article as claimed in claim 2, wherein it also comprises a boss arranged protruding into said circumferential groove at a distance from an end of said circumferential groove which is situated next to said opening.

4. The article as claimed in claim 1, wherein said blocking element has a first face with a first predetermined slope and a second face opposite said first face and with a second predetermined slope greater than said first slope, said first face being directed towards said locking zone on movement of said blocking element in said guide zone, and said second face being directed towards said guide zone when said blocking element is in said locking zone.

5. The article as claimed in claim 1, wherein said second part comprises said at least one blocking element, and said first part comprises said at least one guide zone and said at least one locking zone.

6. The article as claimed in claim 5, wherein said guide and locking zones are arranged in said body of said first part and said at least one blocking element extends protruding from a lower face of said head of said second part, which lower face is configured to come to rest against an upper face of said body.

7. The article as claimed in claim 6, wherein said body also comprises a lower face opposite said upper face, which lower face has a flat central portion and a sloping peripheral portion, and said guide and locking zones are arranged peripherally on said body and open both in said upper face and in said sloping peripheral portion of said lower face of said body.

8. The article as claimed in claim 1, wherein said fixing foot comprises a trunk with an outer lateral wall and two spacing elements protruding from said outer lateral wall and configured to come into contact with the inner faces of said flexible lugs.

9. The article as claimed in claim 8, wherein said inner face of each said flexible lug has a sloping portion and each said spacing element has a sloping portion with a slope similar to that of said sloping portion of said inner face of each said flexible lug.

10. The article as claimed in claim 8, wherein said first part also comprises at least one rotational stop element protruding from a lower face of said body close to said opening of said first part, and both said spacing elements are each provided with a side wall configured to come to rest against said at least one rotational stop element when said article is in its locked configuration.

11. The article as claimed in claim 1, wherein it comprises stop elements formed on said first and second parts and configured to retain said second part axially in relation to said first part.

12. The article as claimed in claim 11, wherein said flexible lugs of said first part have opposing inner faces, lateral faces connecting to said inner faces, and depressions opening respectively in one said inner face and in one said lateral face, and said fixing foot of said second part comprises two teeth extending radially and configured to be accommodated in said depressions when said article is in the locked configuration.

13. The article as claimed in claim 1, wherein said head is formed by a hook with an undercut configured to receive a peg of a vehicle sun visor.

14. The article as claimed in claim 1, wherein the element configured to rest on said support is supported by the body in a spaced away relationship with respect to each of said flexible lugs.

15. The article as claimed in claim 1, wherein the first part has a top that is completely planar save for holes therethrough.

16. The article as claimed in claim 1, wherein when the article is in the fully locked position, the flexible lugs are flexed outward away from each other and held flexed out by the second part, thereby locking the article to the support.

17. The article as claimed in claim 1, wherein said fixing foot comprises a trunk with a globally rectangular contour.

18. The article as claimed in claim 1, wherein said locking zone is a completely separate feature from said guide zone completely spaced away from said guide zone via structure of the article.

19. The article as claimed in claim 1, wherein said guide zone is an arcuate enclosed opening in the first part that opens at least towards the flexible lugs.

20. An article to be blind-fixed to a support provided with an opening of predetermined contour, comprising:
    a first part with two flexible lugs each having a free end and being configured to assume, in the absence of stress, a rest position in which they can be introduced without force into said opening of said support, over a first predetermined length from their first free end, and to assume a working position in which they are spaced in relation to said rest position, in order to fix said article to said support, wherein an element is configured to rest on said support when said flexible lugs have been introduced into said opening of said support over said first predetermined length, and a body to which each said flexible lug is connected by a second end opposite said respective first free end and which is provided with an opening of predetermined contour which opens between said flexible lugs, and
    a second part fitted with a fixing foot having a free end which is configured to cooperate with said first part such that it can be introduced axially from its free end through said opening of said body of said first part, and such that it can be moved in rotation in relation to said first part to cause said flexible lugs to move from their rest position to their working position, and with a head to which said fixing foot is connected via a second end opposite said free end;
    said article being characterized in that it also comprises at least one blocking element, at least one guide zone and at least one locking zone each configured to receive said at least one blocking element, said at least one blocking element, said at least one guide zone and said at least one locking zone being configured to allow the rotation of said second part in relation to said first part until said flexible lugs reach their working position, then the locking in rotation of said second part in relation to said first part, said article thus moving from a waiting configuration in which said blocking element is in said at least one guide zone and said flexible lugs are in their rest position, to a locked configuration in which said blocking element is in said at least one locking zone, said flexible lugs are in their working position and said second part is blocked in relation to said first part, wherein said fixing foot comprises a trunk with a globally rectangular contour defining two lateral spacing faces opposite each other and configured to come into contact with the flat portions arranged on the inner faces of said flexible lugs.

21. An article to be blind-fixed to a support provided with an opening of predetermined contour, comprising:
    a first part with two flexible lugs each having a free end and being configured to assume, in the absence of stress, a rest position in which they can be introduced without force into said opening of said support, over a first predetermined length from their first free end, and to assume a working position in which they are spaced in relation to said rest position, in order to fix said article to said support, wherein an element is configured to rest on said support when said flexible lugs have been introduced into said opening of said support over said first predetermined length, and a body to which each said flexible lug is connected by a second end opposite said respective first free end and which is provided with an opening of predetermined contour which opens between said flexible lugs, and a second part fitted with a fixing foot having a free end which is configured to cooperate with said first part such that it can be introduced axially from its free end through said opening of said body of said first part, and such that it can be moved in rotation in relation to said first part to cause said flexible lugs to move from their rest position to their working position, and with a head to which said fixing foot is connected via a second end opposite said free end;

said article being characterized in that it also comprises at least one blocking element, at least one guide zone and at least one locking zone each configured to receive said at least one blocking element, said at least one blocking element, said at least one guide zone and said at least one locking zone being configured to allow the rotation of said second part in relation to said first part until said flexible lugs reach their working position, then the locking in rotation of said second part in relation to said first part, said article thus moving from a waiting configuration in which said blocking element is in said at least one guide zone and said flexible lugs are in their rest position, to a locked configuration in which said blocking element is in said at least one locking zone, said flexible lugs are in their working position and said second part is blocked in relation to said first part, wherein most of the second part is above all of the first part when the second part and the first part are fully mated.

* * * * *